United States Patent [19]

Hide et al.

[11] Patent Number: 4,745,163

[45] Date of Patent: May 17, 1988

[54] CATALYTIC FILM POLYMERIZATION OF ACETYLENE

[75] Inventors: Ichiro Hide; Junichi Umetsu, both of Sapporo, Japan

[73] Assignee: Hoxan Corporation, Sapporo, Japan

[21] Appl. No.: 925,218

[22] Filed: Oct. 31, 1986

Related U.S. Application Data

[62] Division of Ser. No. 649,506, Sep. 11, 1984, Pat. No. 4,663,123.

[30] Foreign Application Priority Data

Mar. 15, 1984 [JP] Japan ................................. 59-37092
Mar. 16, 1984 [JP] Japan ................................. 59-37529

[51] Int. Cl.[4] .......................... C08F 2/02; C08F 38/02
[52] U.S. Cl. ......................................... 526/62; 526/88; 526/285; 526/901; 422/131; 422/136; 427/301
[58] Field of Search ................... 422/131, 136; 526/62, 526/88, 285, 901; 264/81, 83; 427/301

[56] References Cited

U.S. PATENT DOCUMENTS

| | | | |
|---|---|---|---|
| 2,743,264 | 4/1956 | Buselli et al. | 526/62 |
| 2,935,495 | 5/1960 | Kennedy | 526/62 |
| 3,061,601 | 10/1962 | Watt | 526/62 |
| 4,544,343 | 10/1985 | Hide | 526/285 X |
| 4,553,919 | 11/1985 | Hide | 526/88 X |
| 4,675,137 | 6/1987 | Umetsu | 264/83 X |

*Primary Examiner*—Joseph L. Schofer
*Assistant Examiner*—F. M. Teskin
*Attorney, Agent, or Firm*—Schwartz, Jeffery, Schwaab, Mack, Blumenthal & Evans

[57] ABSTRACT

An apparatus for producing a polyacetylene film by contacting acetylene gas with Ziegler-Natta catalyst to polymerize the acetylene gas in a vessel which comprises a catalyst introduction conduit to be introduced with the Ziegler-Natta catalyst provided at a cap provided at the top of the vessel and having an end opening disposed in the vicinity of the inner surface of the side wall of the vessel in such a manner that the conduit and the vessel are relatively moved in rotation, and a rotary transmission mechanism for driving to rotatably coat the catalyst flowed out from the end opening of the conduit on the inner surface of the bottom from the inner surface of the side wall of the vessel. Thus, the polyacetylene film can be produced in a uniform thickness and in a relatively large area by introducing the Ziegler-Natta catalyst of the suitable quantity, and the catalyst can be spread over the entire surface rapidly by the relative rotation between the conduit and the vessel.

5 Claims, 4 Drawing Sheets

CATALYTIC FILM POLYMERIZATION OF ACETYLENE

This is a division of application Ser. No. 649,506 filed Sept. 11, 1984 now U.S. Pat. No. 4,663,123.

BACKGROUND OF THE INVENTION

This invention relates to an apparatus for producing a polyacetylene film and, more particularly, to such an apparatus adapted to produce a polyacetylene film having uniform thickness and large area.

A polyacetylene is the most simple chain conjugated high-molecular compound which contains as ingredients a carbon atom and a hydrogen atom, and has properties as a semiconductor. Particularly, a polyacetylene membrane which is laminated with Ziegler-Natta catalyst ($Ti(OC_4H_9)_4$-$Al(C_2H_5)_3$ series) has fibril (fibrous ultrafine crystal) mesh structure of approx. 200 Å in diameter. When this membrane is slightly doped with halogen gas or arsenic pentafluride, its conductivity can be largely varied.

Since such a polyacetylene membrane has extreme chemical stability, a light weight and a fibril mesh structure, resulting in a large surface area, the polyacetylene membrane has already been noted as a favorable electrode material for a secondary battery in applications to integrated circuits.

As a method of producing the above-described polyacetylene film, it was heretofore known to produce the polyacetylene film by the method which has the steps of preparing the molar ratio of aluminum/titanium of the Ziegler-Natta catalyst to 3 to 4, and cooling the catalyst at $-78°$ C. with a refrigerant of a dry ice methanol, blowing acetylene gas onto the catalyst, thereby polymerizing the gas in the vicinity of the boundary between the vapor phase and the liquid phase in the surface of the catalyst solution.

An apparatus of the prior art is illustrated in FIG. 1.

In order to heretofore produce actually the above-described polyacetylene film, Ziegler-Natta b is stored in a cylindrical vessel a, the vessel a is fluctuated to adhere the catalyst b to the inner wall surface a' of the vessel a, acetylene gas is introduced from the supply tube c into the vessel a, thereby forming a polyacetylene film d obtained by the polymerization of the gas over the boundary between the vapor phase and the liquid phase of the catalyst b stored in the bottom of the vessel a from the catalyst b adhered to the inner wall surface a'.

In the conventional case, the polyacetylene film d produced on the surface b' in the catalyst b in the bottom is impregnated with a large quantity of catalyst in the fibril mesh structure. Accordingly, its quality is deteriorated, thus only the polyacetylene film d produced on the inner wall surface a' can be utilized as the material for the electrode of the secondary battery or the other field. The production efficiency is therefore low. Further the catalyst b adhered to the peripheral surface a' tends to flow down toward the bottom surface even in the polyacetylene film d of the inner wall surface. Thus, the bottom side becomes too thick, resulting in an irregular thickness. Further, it is difficult to adhere the catalyst sufficiently to the upper part of the surface a'. Thus, it is necessary to store a large quantity of the catalyst in the bottom and to rotate it at a high speed, thereby disadvantageously causing the film of high quality not to be produced.

SUMMARY OF THE INVENTION

Accordingly, it is an object of this invention to provide an apparatus for producing a polyacetylene film which can eliminate the aforementioned drawbacks and disadvantages, which can continuously freely coat catalyst from the inner surface of the side wall to the inner surface of the bottom of a container by arranging a catalyst introduction conduit for coating the catalyst on the inner surface of the side wall of the container and rotatably move the container and the conduit relative to each other to produce a uniform polyacetylene film, thereby eliminating the problems described above.

It is another object of this invention to provide an apparatus for producing a polyacetylene film which can, in addition to the above object, continuously freely coat catalyst from the inner surface of the side wall to the inner surface of the bottom of the container by forming the bottom of the container in a tapered shape, having an outlet and to rotatably move the container and a catalyst introduction conduit relative to each other to produce a uniform polyacetylene film, thereby further improving the advantages of the above object.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

The present invention will now be described in more detail with reference to the accompanying drawings.

Figure 1:
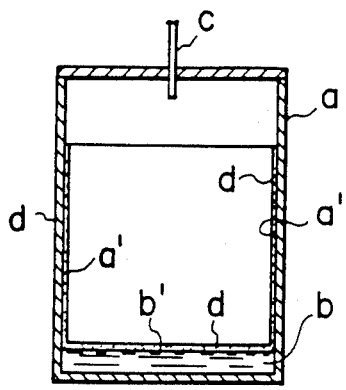
FIG. 1 is a schematic vertical sectional front view showing a conventional apparatus for producing a polyacetylene film.
Figure 2:
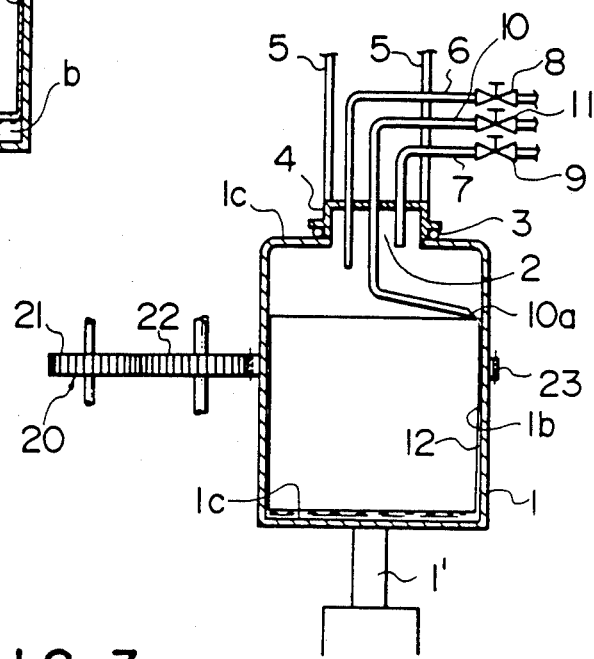
FIGS. 2 and 3 are vertical sectional front and plan views of an embodiment of an apparatus for producing a polyacetylene film according to the present invention.
Figure 3:
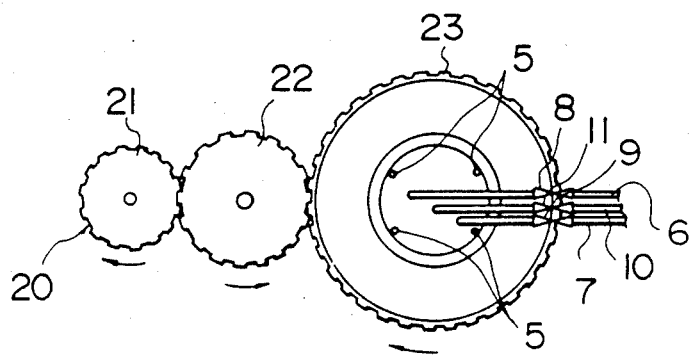

In FIGS. 2 and 3, reference numeral 1 designates a vessel formed in a covered cylindrical shape. An opening is formed at the center of a ceiling wall 1c of the vessel 1. The vessel 1 is slidably contacted with an O-ring 3 engaged with the outer periphery of the lower end of a cup-shaped cap 4 at the upper end face of the peripheral edge of the opening 2. The cap 4 is fixedly secured by fastening arm levers 5. The vessel 1 is rotatably supported to a rotatable support shaft 1' as an axial center.

A conduit 6 for introducing acetylene gas, connected to a supply source, not shown, and an exhaust conduit 7 for flowing the acetylene gas in the vessel 1 out are opened and passed through the vessel 1 at the cap 4, and control valves 8, 9 are respectively provided at the conduits 6 and 7 for maintaining the acetylene gas atmosphere under a predetermined constant pressure.

Further, a conduit 10 connected to the supply source, not shown, for introducing catalyst such as Ziegler-Natta catalyst, is passed through the cap 4, and the conduit 10 of the part extended into the vessel 1 is bent substantially in L shape. The opening 10a at the end of the conduit 10 is disposed in the vicinity of the inner surface 1b of the wall at the vessel side to introduce and coat the Ziegler-Natta catalyst on the inner surface 1b of the side wall of the vessel 1, and a catalyst control valve 11 for controlling the quantity of the catalyst to be introduced into the vessel 1 is provided in the conduit 10.

On the other hand, reference numeral 20 designates a rotary transmission mechanism for rotatably driving the vessel 1 in such a manner that a drive gear 21 rotated by a drive source, not shown, is engaged in mesh with a driven gear 23 provided on the outer periphery of the vessel 1 through an intermediate gear 22.

In operation for producing the polyacetylene film by using the apparatus thus constructed as described above, the vessel 1 is evacuated in vacuum, the vessel 1 is then rotated by the rotary transmission mechanism 20, the catalyst control valve 11 is suitably opened to coat the Ziegler-Natta catalyst dropped from the opening 10a at the end of the conduit 10 from the inner surface 1b of the side wall of the vessel 1 on the entire surface of the inner surface 1c of the bottom. In this case, the control valve 11 controls so that the quantity of adequate amount.

Subsequently, after the catalyst control valve 11 is closed, the gas control valve 8 is opened to introduce the acetylene gas into the vessel 1. Thus, the acetylene gas is polymerized by the Ziegler-Natta catalyst coated on the inner surface 1b of the side wall and the inner surface 1c of the bottom in the vessel to produce the polyacetylene film 12. In this case, the vessel 1 may remain rotating or may be stopped steadily.

Figure 4:
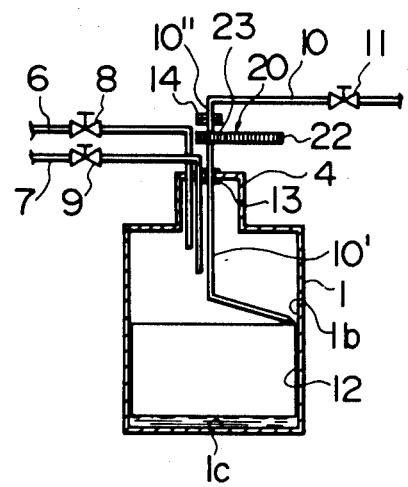
FIGS. 4 and 5 are vertical sectional front and plan views of another embodiment of an apparatus for producing a polyacetylene film according to the present invention.
Figure 5:
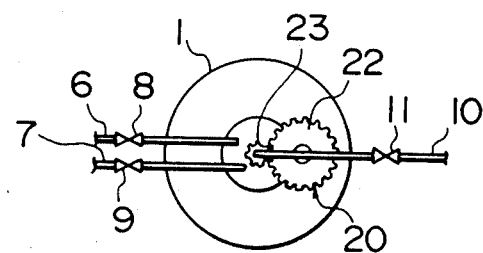
Figure 6:
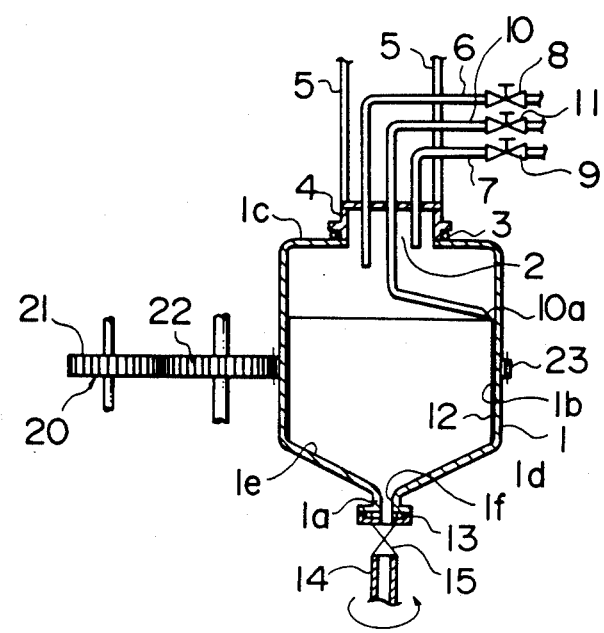
FIGS. 6 and 7 are vertical sectional front and plan views of still another embodiment of an apparatus for producing a polyacetylene film according to the present invention.
Figure 7:
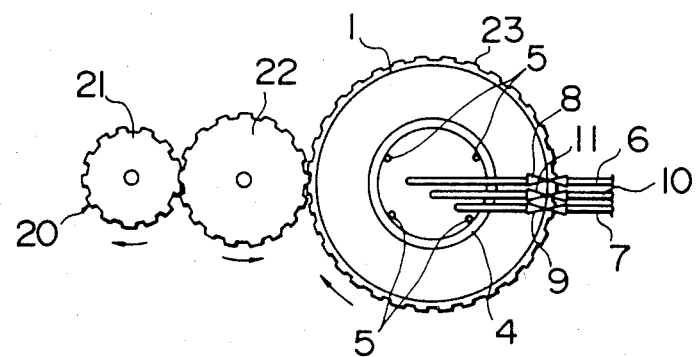

FIGS. 4 and 5 show a second embodiment modified from the first embodiment of the invention. The vessel 1 is rotatably in the first embodiment, while the conduit 10 for introducing the catalyst is rotated in this modified embodiment.

More particularly, reference numeral 20 designates a rotary transmission mechanism in the same manner as the first embodiment, but, in the modified embodiment, a drive gear rotated by a drive source, not shown, is engaged in mesh with a driven gear 23 provided on the outer periphery of the conduit 10 through an intermediate gear 22.

The conduit 10 is not merely passed through the cap 4, but is passed in the sealed state through an O-ring engaged with the opening at the upper surface of the cap 4.

Further, a mechanical seal 14 is interposed in the jointed section between the rotary portion 10' and the nonrotary portion 10" of the conduit 10 so that the rotary portion 10' may rotate in the sealed state.

The conduit 10 in the above embodiments is constructed as described above. However, the conduit 10 may also be constructed so that the opening 10a at the end can be adjusted at the position in an elevational direction, thereby controlling the area to be coated with the catalyst to the inner surface 1b of the side wall and the inner surface 1c of the bottom in the vessel 1 so as to freely select the area of the polyacetylene film 12 to be produced.

Further, the time required for coating the catalyst may be shortened by providing a plurality of conduits 10.

A third embodiment of the invention will now be described in detail with reference to FIGS. 6 to 9. The fundamental structure of this embodiment is the same as that of the first embodiment and the same reference numerals indicate the same or corresponding parts.

The difference between the third embodiment and the first embodiment of the invention resides in that the vessel 1 is not only formed in a cylindrical shape but also the bottom 1d of the vessel 1 is tapered to be converged downwardly, an exit 1f for exhausting the catalyst is formed at the center of the bottom 1d so as to pass through the rotary support shaft 1a, the shaft 1a having the exit 1f is further connected to the catalyst exhaust conduit 14 through a mechanical seal 13, and a catalyst exhaust valve 15 is interposed in the conduit 14 for controlling the quantity of the catalyst to be flowed out.

Then, in operation for producing the polyacetylene film with the apparatus thus constructed as described in this embodiment, the vessel 1, in which inert gas is sealed, is first rotated by the rotary transmission mechanism 20, the catalyst control valve 11 is then opened suitably to coat the Ziegler-Natta catalyst dropped from the opening 10a at the end of the conduit 10 over the entire surfaces of the inner surface 1b of the side wall and the inner surface 1e of the bottom in the vessel 1. In this case, the apparatus of this embodiment adequately controls the quantity of the catalyst to be introduced by the control valve 11 in the same manner as the first embodiment, but the catalyst control valve 15 controls to open in the degree as required so that the quantity of the catalyst to be coated does not become excessive. The following steps of producing the polyacetylene film of the apparatus of this embodiment is entirely the same as the content described with respect to the first embodiment of the invention.

Figure 8:
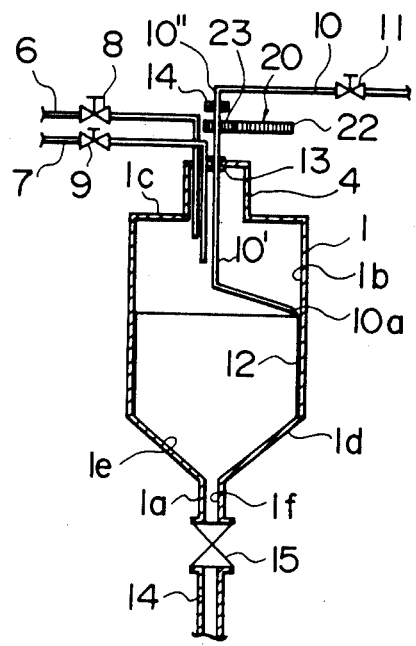
FIGS. 8 and 9 are vertical sectional front and plan views of still another embodiment of an apparatus for producing a polyacetylene film according to the invention.
Figure 9:
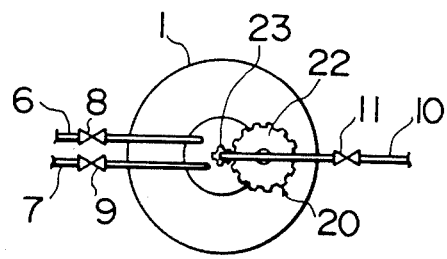

A fourth embodiment is shown in FIGS. 8 and 9 and is constructed corresponding to the contents of the modification shown in FIGS. 4 and 5 with respect to the first embodiment of the invention. The vessel 1 is rotatable in the embodiments shown in FIGS. 6 and 7, while, in the modified embodiment in FIGS. 8 and 9, the catalyst introducing conduit 10 is rotatable. Since the construction and the operation of this modified embodiment is substantially the same as those shown in FIGS. 4 and 5, the detailed description of this modified embodiment will be omitted.

According to the first embodiment of the present invention as described above, there is provided an apparatus for producing a polyacetylene film by contacting acetylene gas with Ziegler-Natta catalyst to polymerize the acetylene gas in a vessel 1 which comprises a catalyst introduction conduit 10 to be introduced with the Ziegler-Natta catalyst provided at a cap 4 provided at the top of the vessel 1 and having an end opening 10a disposed in the vicinity of the inner surface 1b of the side wall of the vessel in such a manner that the conduit 10 and the vessel 1 are relatively moved in rotation, and a rotary transmission mechanism 20 for driving to rotatably coat the catalyst flowing out from the end opening 10a of the conduit 10 on the inner surface 1b of the bottom from the inner surface 1b of the side wall of the vessel 1. Thus, the polyactylene film 12 can be produced in a uniform thickness and in a relatively large area by introducing the Ziegler-Natta catalyst of the suitable quantity, and the catalyst can be spread over the entire surface rapidly by the relative rotation between the conduit and the vessel. Accordingly, the catalyst is not partly excessively coated, and thereby a polyacetylene film of high quality is obtained.

Further, according to the third embodiment of the present invention, there is provided an apparatus for producing a polyacetylene film, constructed in the same manner as the first embodiment, in which the bottom of the vessel is further formed in a cconverted tapered shape and an exit 1f if provided at the end of the bottom of the vessel. Thus, the catalyst is not excessively coated due to the introduction of the excessive catalyst, thereby obtaining the polyacetylene film of high quality in addition to the advantages of the first embodiment of the invention.

What is claimed is:

1. A process for the catalytic film polymerization of acetylene, comprising the steps of:
    (a) providing an apparatus which includes
        (1) a polymerization vessel having an interior surface defining a sidewall portion and a bottom portion;
        (2) means for feeding a catalyst exclusively along said sidewall portion;
        (3) means for containing said catalyst to form a layer thereof along said interior surface, said coating means preventing a flow of catalyst from said sidewall portion to said bottom portion in excess of that necessary to produce a polymerized film of uniform thickness along said interior surface; and
        (4) means for maintaining a single continuous monomer gas stream at said interior surface sufficient for uniform polymerization at all locations along said interior surface;
    (b) producing an inert atmosphere in the polymerization vessel and feeding a catalyst exclusively along said sidewall portion of said polymerization vessel;
    (c) coating said catalyst along said interior surface of said polymerization vessel and allowing said catalyst to flow from said sidewall portion to said bottom portion;
    (d) regulating said catalyst flow to maintain a level of flow no greater than that necessary to produce a polymerized film of uniform thickness in step (f);
    (e) feeding an acetylene monomer gas to said vessel;
    (f) maintaining a homogeneous acetylene monomer gas concentration along said interior surface of said polymerization vessel; and
    (g) polymerizing said acetylene monomer gas to form a polymer film of uniform thickness along said interior surface.

2. A process according to claim 1, wherein said process includes the step of removing said catalyst from said bottom portion after it flows to said bottom portion in step (c).

3. A process according to claim 1, wherein said coating step includes rotating said polymerization vessel relative to said catalyst feeding means.

4. A process according to claim 1, wherein said coating step includes rotation said catalyst feeding means relative to said polymerization vessel.

5. A process according to claim 1, wherein said catalyst comprises a Ziegler-Natta catalyst.

* * * * *